United States Patent
Lamontia et al.

(10) Patent No.: US 9,227,467 B2
(45) Date of Patent: Jan. 5, 2016

(54) PNEUMATIC TIRE

(71) Applicant: E I DU PONT DE NEMOURS AND COMPANY, Wilmington, DE (US)

(72) Inventors: Mark Allan Lamontia, Landenberg, PA (US); William Herbert Coulter, Wilmington, DE (US); Monty C McNeil, Midlothian, VA (US); Harish Viswanathan, Hyderabad (IN)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 218 days.

(21) Appl. No.: 13/947,185

(22) Filed: Jul. 22, 2013

(65) Prior Publication Data

US 2015/0020942 A1    Jan. 22, 2015

(51) Int. Cl.
| | |
|---|---|
| *B60C 15/00* | (2006.01) |
| *B60C 15/06* | (2006.01) |
| *B60C 9/12* | (2006.01) |
| *B60C 9/02* | (2006.01) |
| *B60C 9/09* | (2006.01) |

(52) U.S. Cl.
CPC ............... *B60C 9/12* (2013.01); *B60C 9/0238* (2013.04); *B60C 9/09* (2013.01); *B60C 15/0018* (2013.04); *B60C 15/0036* (2013.04); *B60C 15/0045* (2013.04); *B60C 15/0607* (2013.04); *B60C 2009/0078* (2013.04); *B60C 2009/0276* (2013.04); *B60C 2015/065* (2013.04); *B60C 2015/0625* (2013.04); *B60C 2015/0678* (2013.04)

(58) Field of Classification Search
CPC  B60C 15/00;  B60C 15/0009;  B60C 15/0018; B60C 15/06;  B60C 15/0603;  B60C 15/0607
See application file for complete search history.

(56) References Cited

U.S. PATENT DOCUMENTS

| | | | |
|---|---|---|---|
| 5,331,053 | A | 7/1994 | Atkinson et al. |
| 5,391,623 | A | 2/1995 | Frances |
| 5,480,941 | A | 1/1996 | Frances |
| 5,830,395 | A | 11/1998 | Vercesi et al. |
| 6,106,752 | A | 8/2000 | Chang et al. |
| 6,899,785 | B2 | 5/2005 | Dutra et al. |
| 7,005,022 | B2 | 2/2006 | Sasaki |
| 7,278,458 | B2 * | 10/2007 | Allard ........................... 152/555 |

FOREIGN PATENT DOCUMENTS

| | | | |
|---|---|---|---|
| DE | 2202944 | * | 8/1973 |
| DE | 102008055577 | * | 6/2010 |
| EP | 638445 | * | 2/1995 |
| WO | WO 00/20235 | * | 4/2000 |

* cited by examiner

*Primary Examiner* — Justin Fischer

(57) ABSTRACT

This invention pertains to a tire comprising at least one carcass ply and at least one breaker ply, the carcass and breaker plies each comprising continuous filaments having a tenacity of at least 15 grams force per dtex and a modulus of at least 400 grams force per dtex wherein the carcass ply turn-ups terminate under the at least one breaker ply. The invention further pertains to a tire comprising a plurality of apex components and carcass ply turn-ups that terminate within the apex region of the tire. The invention also discloses a tire wherein the carcass ply turn-ups terminate in the upper sidewall region of the tire and ply spacers are located between ply-turn-ups.

4 Claims, 9 Drawing Sheets

PNEUMATIC TIRE

BACKGROUND

1. Field of the Invention

This invention pertains to the field of pneumatic tires. It is particularly suitable for tires having a bias ply construction.

2. Background

In certain circumstances vehicles, especially trucks, may be frequently loaded with goods beyond the recommended upper weight limit. Excessive overload can result in tire failure in the region of the carcass ply turn-up after prolonged operation. There is therefore a need to increase the fatigue life of tire in the vicinity of the carcass plies.

SUMMARY OF THE INVENTION

This invention pertains to a tire comprising at least one carcass ply and at least one breaker ply, the carcass and breaker plies each comprising continuous filaments having a tenacity of at least 15 grams force per dtex and a modulus of at least 400 grams force per dtex wherein the carcass ply turn-ups terminate under the at least one breaker ply.

The invention further pertains to a tire comprising a plurality of apex components and carcass ply turn-ups that terminate within the apex region of the tire.

The invention also discloses a tire wherein the carcass ply turn-ups terminate in the upper sidewall region of the tire and ply spacers are located between ply-turn-ups.

DETAILED DESCRIPTION

Figure 1:
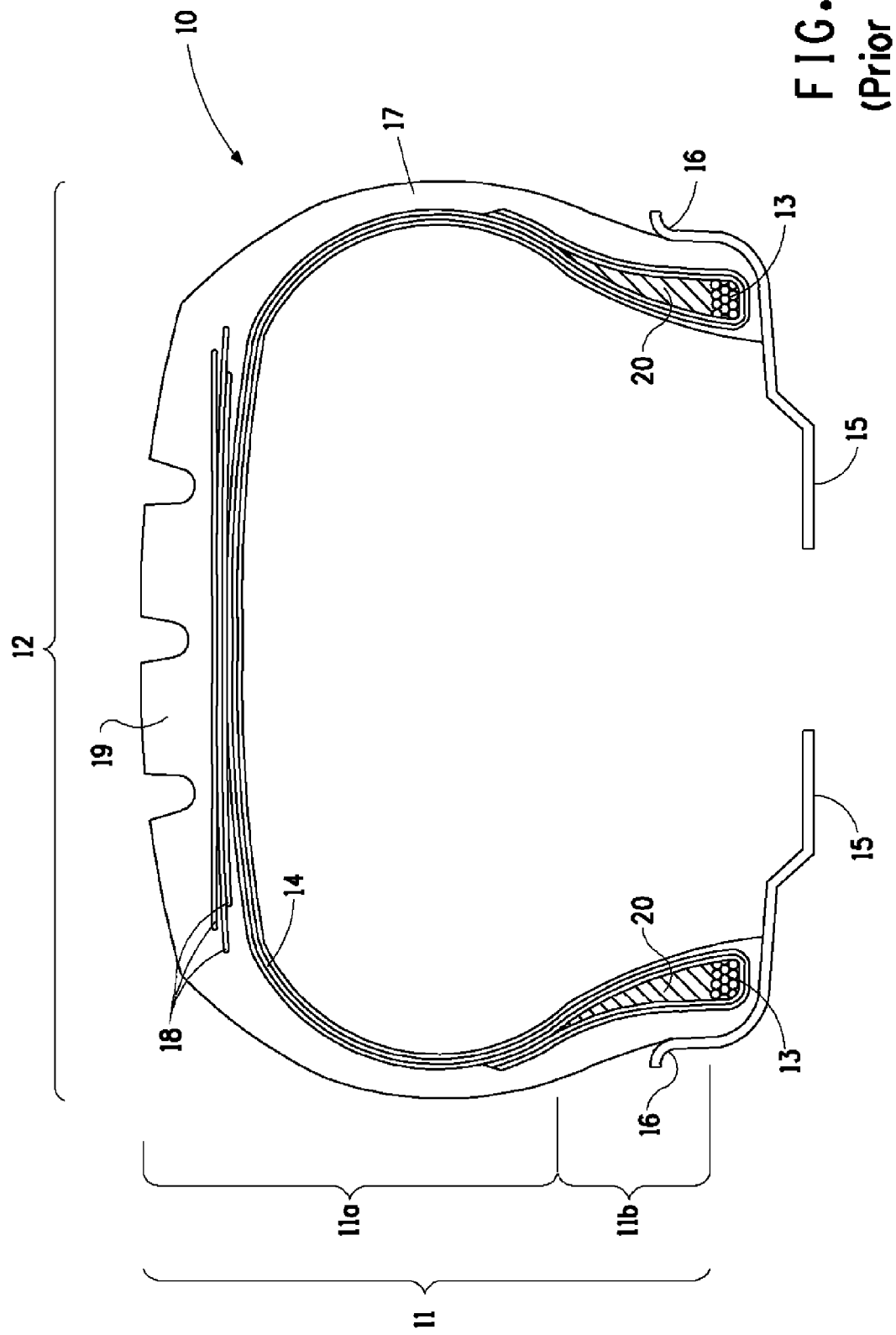
FIG. 1 is shows the main components of a conventional prior art vehicle tire.

Shown generally at 10 in FIG. 1 is a cross-section of a prior art vehicle tire mounted on a rim 15, with the tire comprising two principal sections, a sidewall section 11 and a crown section 12. A tire sidewall is the area between the tire bead and the tread. "Crown" means that portion of the tire within the width limits of the tire tread. Beads 13 are located where the tire sits on the rim flange 16. "Bead" means that part of the tire comprising an annular tensile member wrapped by ply cords and shaped, with or without other reinforcement elements such as flippers, chippers, toe guards and chafers, to fit the wheel rim. The tire apex, shown at 20, is a triangular-shaped elastomeric extruded profile that mates against the bead and provides a cushion between the rigid bead and the flexible inner liner and body ply. The apex region of the sidewall is shown at 11b and the upper section of sidewall at 11a. Carcass cords 14 provide strength and load bearing capabilities to the tire. "Carcass" means the tire structure apart from the belt structure, tread, undertread, and sidewall rubber over the plies, but not including the beads. A carcass is sometimes called a casing. The carcass cords are anchored by wrapping them around the bead wires 13. "Tread" means that portion of a tire that comes into contact with the road when the tire is normally inflated and under normal load. As shown in FIG. 1 a "belt" 18 is a narrow layer of tire cord material directly under the tread in the crown of the tire. In truck tires, belts are sometimes called breakers, however, both terms may be used interchangeably. A radial tire comprises one or more carcass plies whereas a bias tire comprises at least two carcass plies. In some circumstances only one breaker ply is required, although most tire designs include at least two breaker plies.

Figure 2:
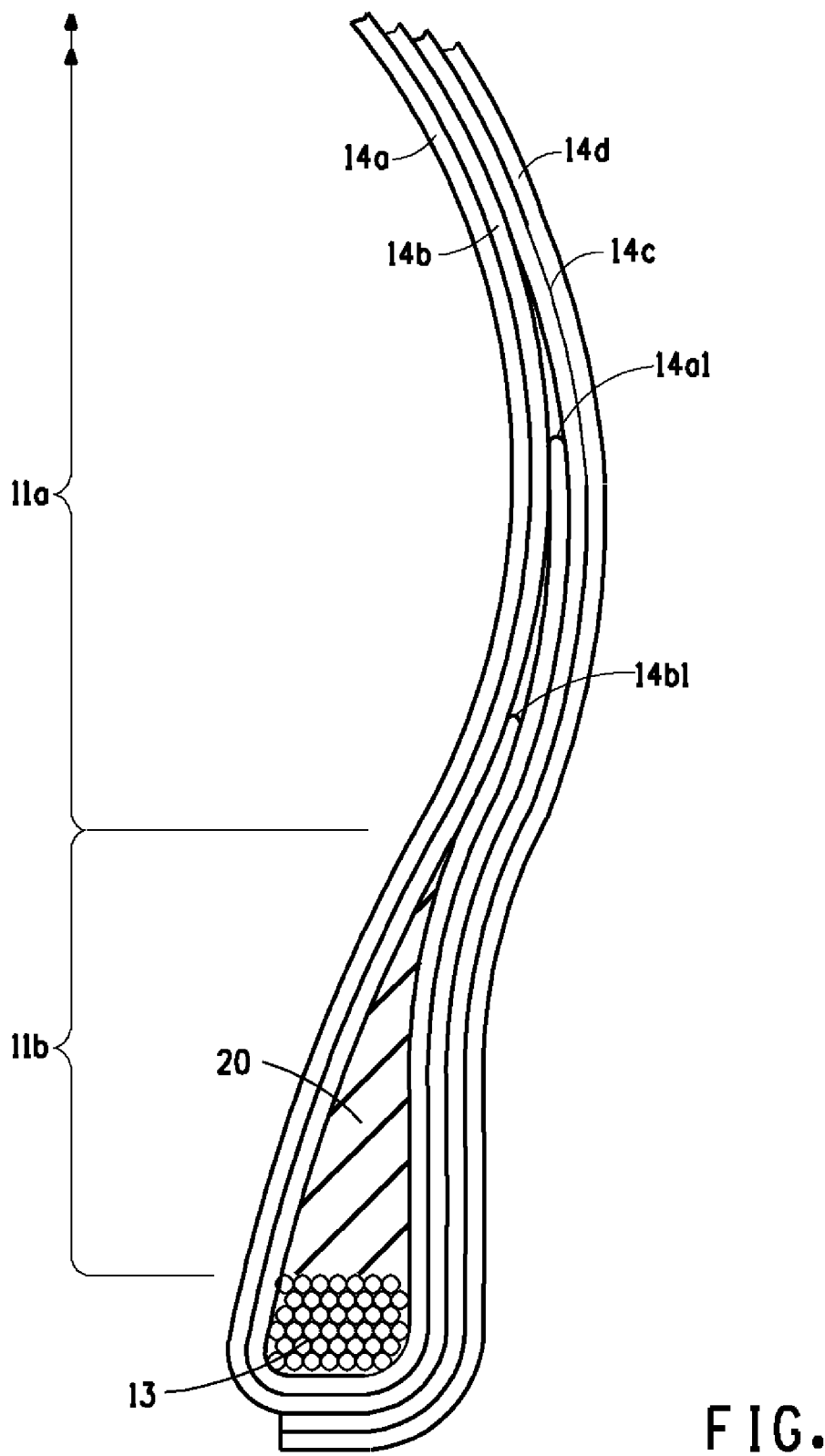
FIG. 2 is a representation of a prior art vehicle tire.

A prior art design as shown FIG. 2 comprises a first carcass ply 14a passing over bead 13 with a ply turn-up terminating at 14a1 in the upper section of the sidewall 11a above the apex section of sidewall 11b. Similarly, a second carcass ply 14b has a ply turn-up terminating at 14b1. The first ply turn-up 14a1 is farther up the sidewall than the second ply turn-up 14b1. Third and fourth carcass plies (outer plies) 14c and 14d are positioned on the outside of the second ply, begining below the bead and extending across the tire to terminate below the corresponding bead on the other side of the tire.

First Embodiment

Figure 3A:
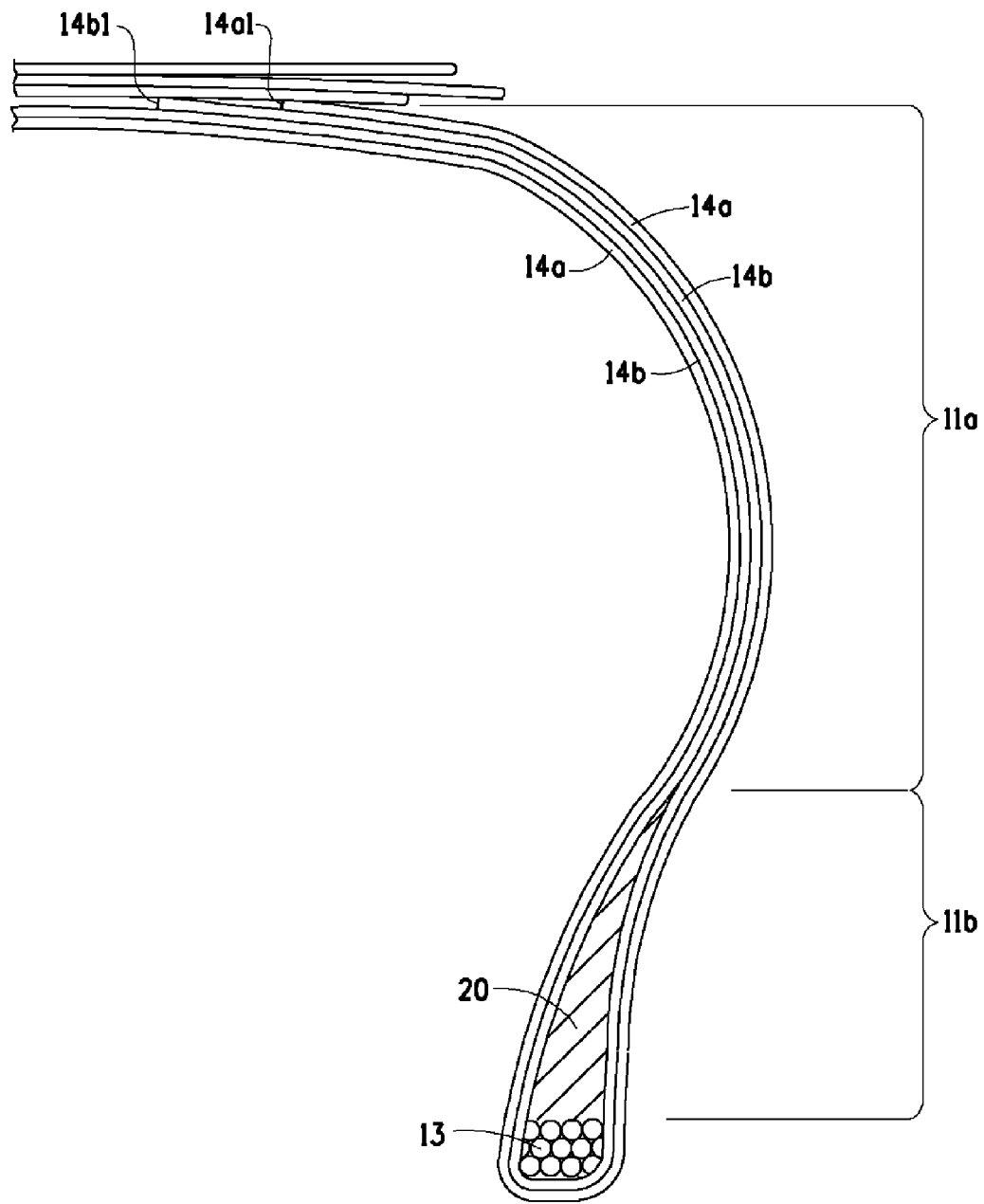
FIGS. 3A, 3B, 4A, 4B, 5A, 5B and 6 depict embodiments of this invention.

A first embodiment of this invention pertains to a tire comprising at least one carcass ply and at least one breaker ply, each ply comprising continuous filaments, wherein the carcass ply turn-ups terminate under the at least one breaker ply. FIG. 3A shows a first carcass ply 14a having a ply turn-up that extends around the tire sidewall to terminate under a breaker ply at 14a1. An optional second carcass ply 14b terminates under the breaker ply 18 at 14b1. Additional plies may be added in this manner if necessary.

Figure 3B:
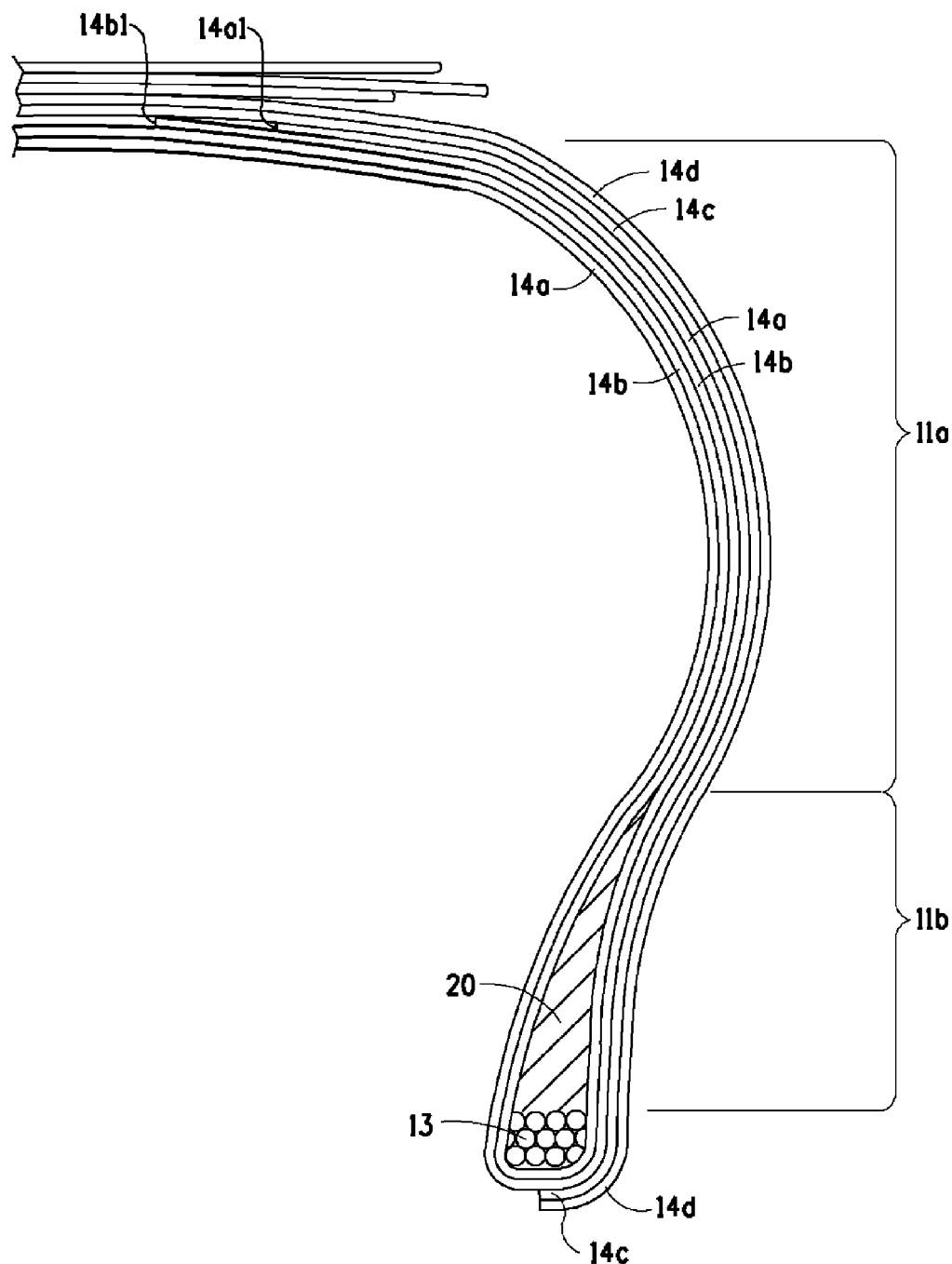

FIG. 3B shows a variant of this embodiment wherein the design further comprises, as in the prior art FIG. 2, outer carcass plies 14c and 14d each ply comprising continuous filaments.

Second Embodiment

Figure 4A:
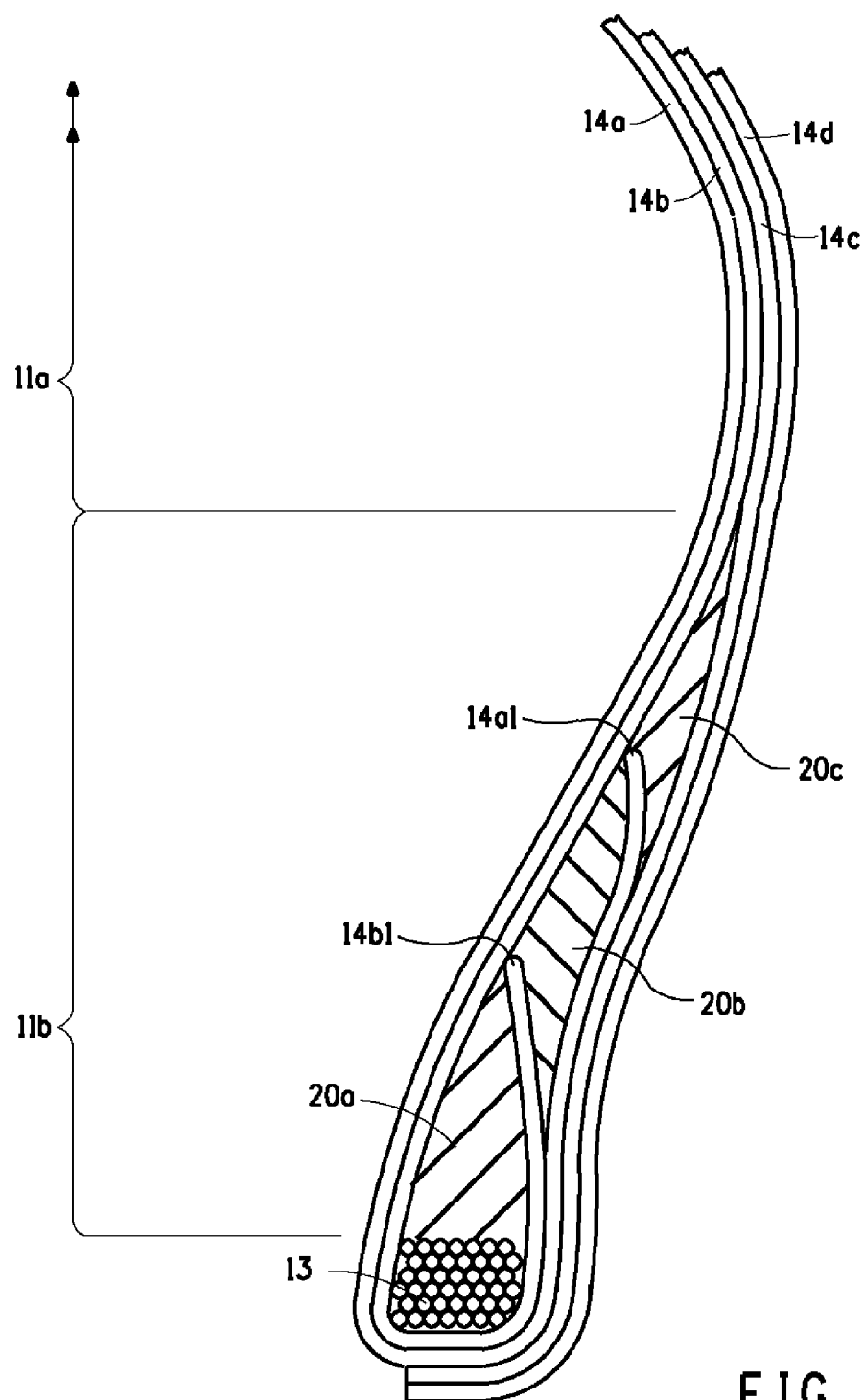

This embodiment, as shown in FIG. 4A, pertains to a tire comprising a bead, an apex, and first, second and third carcass plies, each ply comprising continuous filaments, wherein turn-ups of the first and second carcass plies, 14a1 and 14b1, respectively, terminate within the apex region 11b of the sidewall. In one version of this embodiment, the first and second ply turn-ups, 14a1 and 14b1, respectively, terminate on contact with second ply 14b. A first apex component 20a is positioned between the bead 13, the second carcass ply 14b and the second carcass ply turn-up 14b1. A second apex component 20b is positioned between the second carcass ply turn-up 14b1, the second carcass ply 14b and the first carcass ply turn-up 14a1. A third apex component 20c is positioned between the first carcass ply turn-up 14a1, the second carcass ply 14b and the third carcass ply 14c, which is an outer ply. The first, second and third apex components comprise an elastomeric compound having a modulus in the range of from 3 to 50 MPa. An optional fourth ply, also an outer ply, is shown at 14d.

Figure 4B:
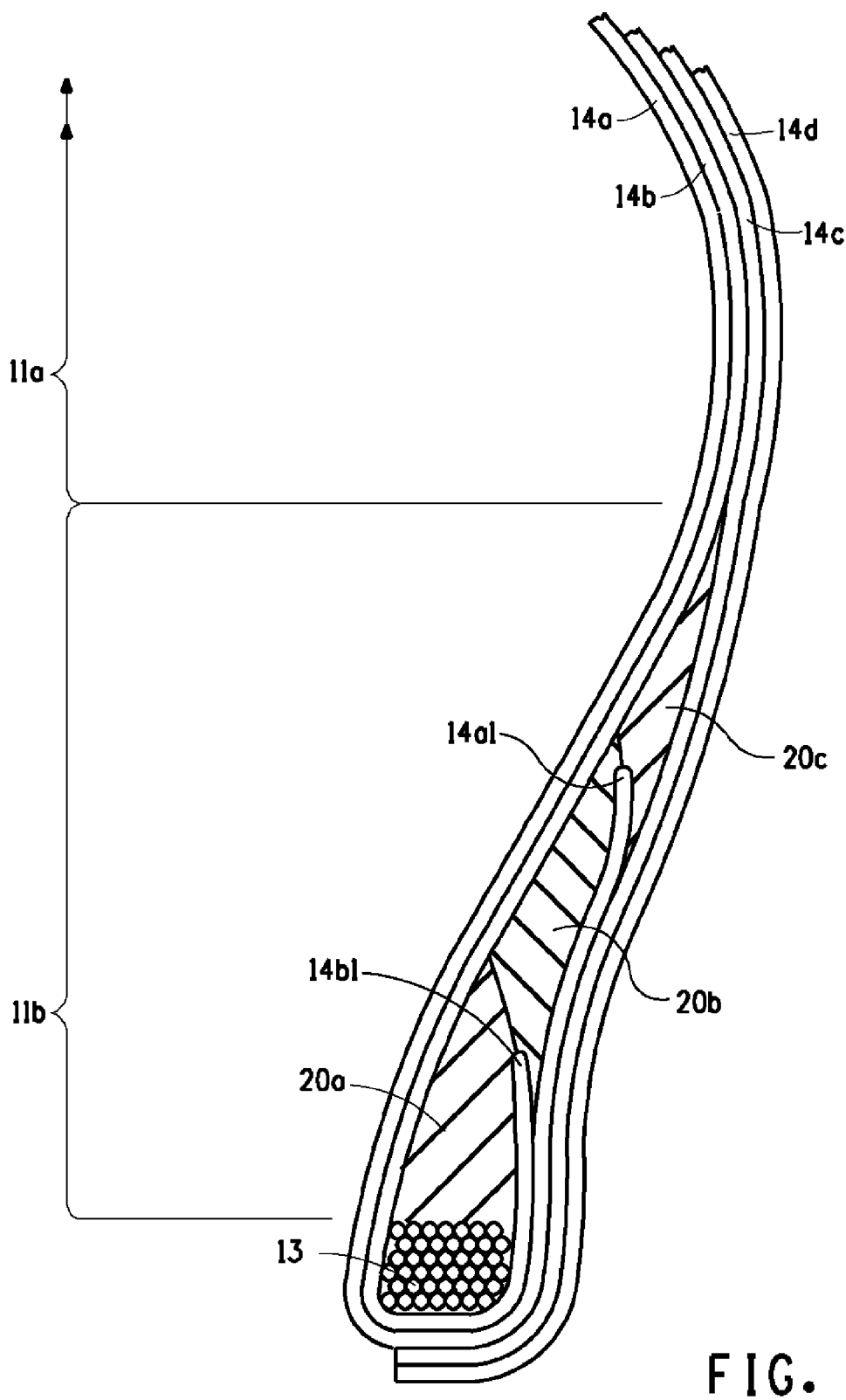

In an alternative version of this embodiment as shown in FIG. 4B, ply turn-ups 14a1 and 14b1, terminate within the apex rubber compound but do not make contact with ply 14b. Combinations of plies having ply turn-ups terminating on contact with second ply 14b or terminating within the apex rubber compound are also possible.

In the above embodiments, the apex normally has a triangular cross-section, but other rhomboidal profiles may also be used.

Third Embodiment

Figure 5A:
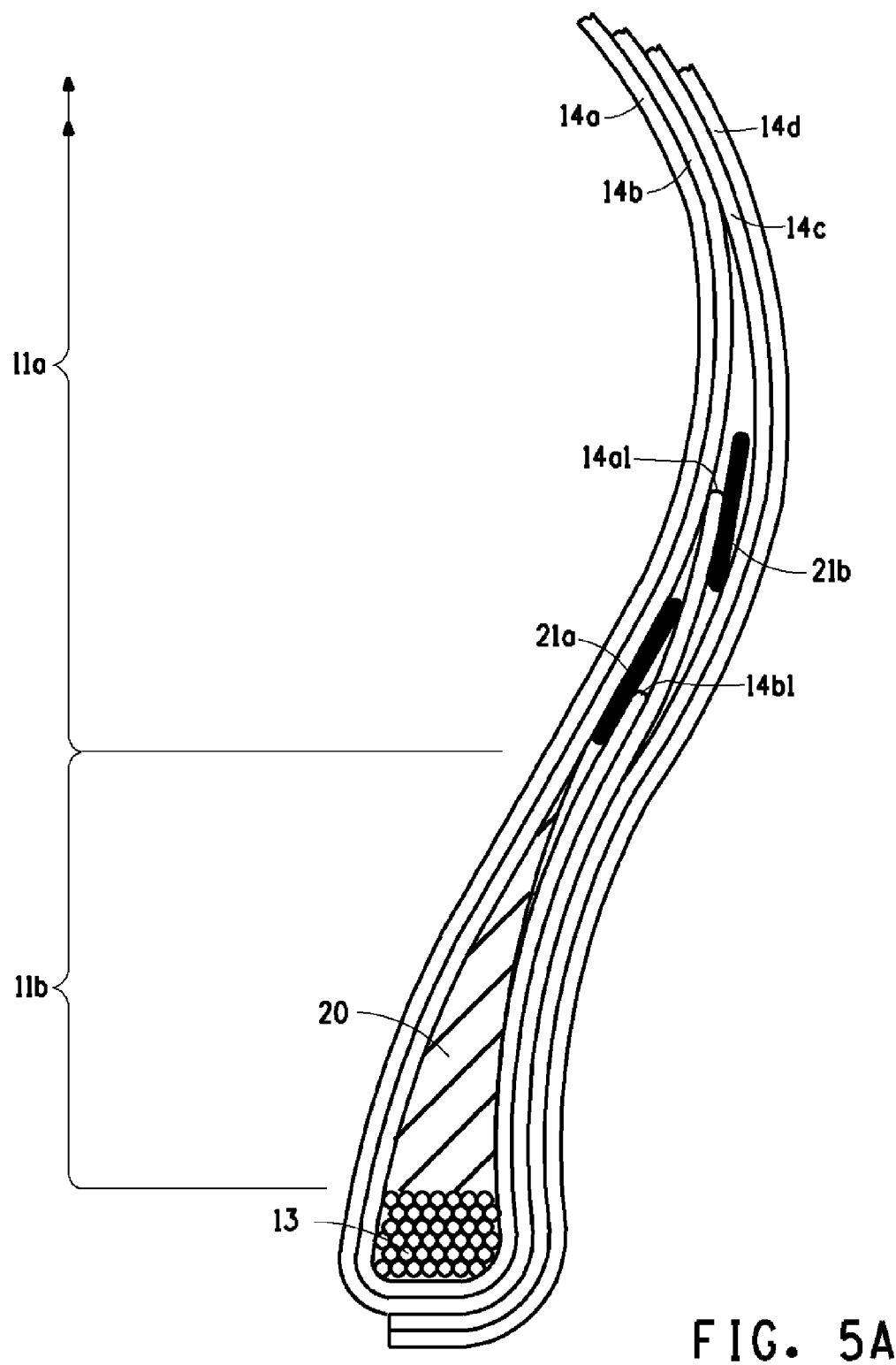

This embodiment, as shown in FIG. 5A, pertains to a tire comprising a bead 13, an apex 20, a first 14a, second 14b and third 14c carcass ply, each ply comprising continuous filaments wherein turn-ups of the first and second carcass plies terminate within the upper sidewall region 11a of the tire at 14a1 and 14b1, respectively. In one version of this embodiment, a first ply separator 21a is positioned between the second ply turn-up 14b1 and the second ply 14b and extends up to or beyond the end of the second ply turn-up 14b1. In another version of this embodiment, a second ply separator 21b is positioned between the first ply turn-up 14a1 and the third ply 14c and extends up to or beyond the end of the first ply turn-up. In a further version of this embodiment, both the first and second ply separators, 21a and 21b respectively, are present. The first and second ply separators comprise an elastomeric compound having a modulus of no greater than 4 MPa. In some embodiments, the elastomeric compound has a modulus of no greater than 3 MPa. In some other embodiments, the elastomeric compound has a modulus of from 3 to 4 MPa. Additional outer plies such as 14d may also be present.

Figure 5B:
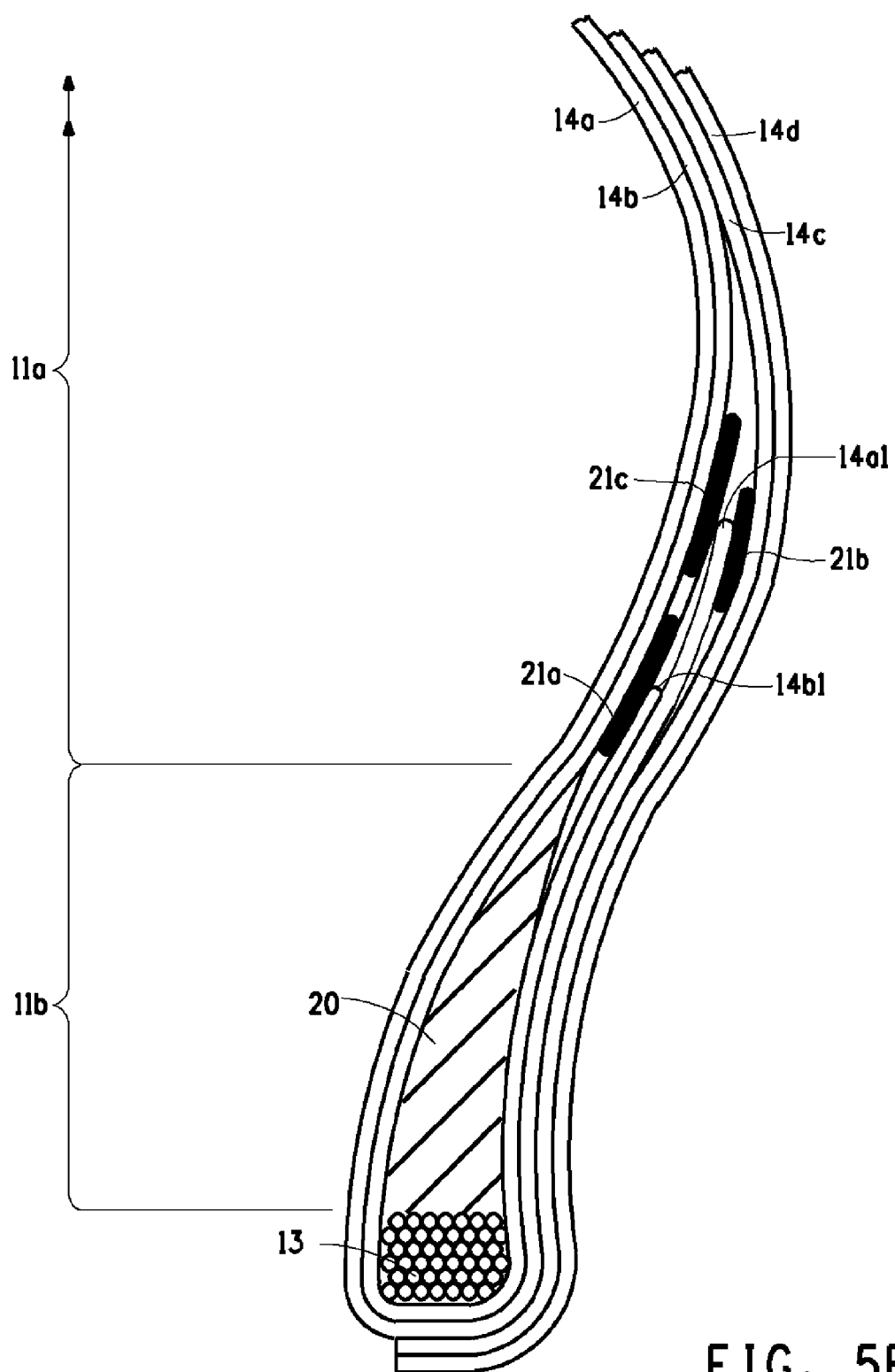

Yet another variant of this embodiment is shown in FIG. 5B and pertains to a tire comprising a bead 13, an apex 20, a first carcass ply 14a, second carcass ply 14b and third carcass ply 14c wherein turn-ups of the first and second carcass plies 14a1 and 14b1, respectively, terminate in the upper sidewall region. A first ply separator 21a is positioned between the second ply turn-up 14b1 and the second ply 14b and extends up to or beyond the end of the second ply turn-up. A second ply separator 21b is positioned between the first ply turn-up 14a1 and the third ply 14c and extends up to or beyond the end of the first ply turn-up 14a1. A third ply separator 21c is positioned between the second ply 14b and the first ply turn-up 14a1 and extends up to or beyond the first ply turn-up. In one embodiment, both the first separator ply 21a and third separator ply 21c are present. In another embodiment both the second separator ply 21b and third separator ply 21c are present in this version of this embodiment. In yet another embodiment, the first, second and third ply separators are all present. The first, second, and third ply separators comprise an elastomeric compound having a modulus of no greater than 4 MPa. In the above embodiments, the ply separators may be of square, rectangular or other cross-section. Additional outer plies such as 14d may also be present.

In both FIGS. 5A and 5B there are areas above and below the ply separators that are shown as spaces. In a tire, this space would be filled with rubber, but the spaces are shown here as blank to provide clarity in viewing the figures. The same comment applies to the regions above the ply turn-ups in FIGS. 2, 3A and 3B.

Stiffness Layer

Figure 6:
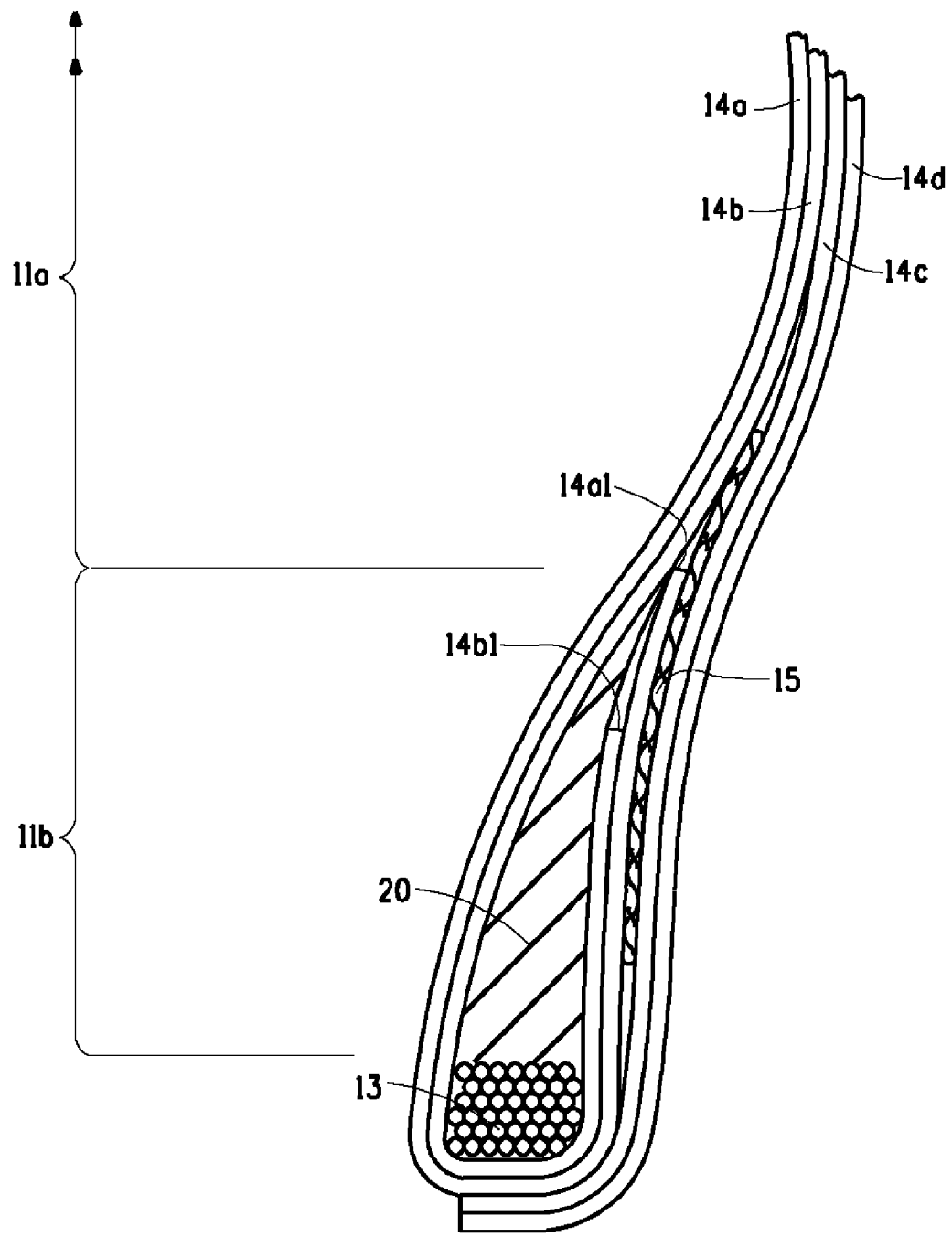

In some embodiments, a stiffness layer is positioned between the ply turn-up and the outer carcass ply. This is shown for example in FIG. 6 where the stiffness layer 15 is positioned above the bead and between the first carcass ply turn-up 14a1 and the first outer carcass ply 14c. Preferably, the stiffness layer is a woven fabric comprising continuous filament yarns. A suitable filamentary material for the fabric is nylon. A preferred weave style is a plain or leno weave although other styles may be used. In FIG. 6, the area above and below the stiffness layer is shown as a space. In a tire, this space would be filled with rubber, but the spaces are shown here as blank to provide clarity in viewing the figure.

Filaments

The carcass and breaker plies comprise continuous filaments that may be polymeric or metallic. Filaments of the same or different materials may be combined to form a yarn or cord that may be twisted or non-twisted. A suitable metallic filament is steel such as is available from Bekaert N V Kortrijk, Belgium. Polymeric filaments include those of aromatic polyamide, aromatic co-polyamide, aliphatic polyamide and polyester. A suitable aromatic polyamide is p-aramid such as is available from E. I. du Pont de Nemours and Company, Wilmington, Del. under the trademark Kevlar®. A suitable aliphatic polyamide is nylon. A suitable polyester is polyethyleneterephthalate (PET).

The yarns have a tenacity of at least 15 grams force per dtex and a modulus of at least 400 grams per dtex.

Production of Tires

Generally, tires are made in a multiple step process where the process comprises, as a first step, producing one or more layers by compounding, calendering or extruding elastomeric sheet. The process can additionally comprise consolidating a plurality of layers of elastomer.

One process involves high shear mixing of raw materials (elastomer and other additives) to compound the elastomer followed by roll milling and/or calendering. The high shear mixing ensures that the ingredients are uniformly dispersed in the elastomer. The first compounding process phase involves mastication or breaking down of the polymer. Natural rubber may be broken down on open roll mills, but it is a more common practice to use a high shear mixer having counter rotating blades such as a Banbury or Shaw mixer. Sometimes, a separate premastication step may be used. For synthetic rubbers, premastication is only necessary when the compound contains a polymer blend. This is followed by masterbatching when most of the ingredients are incorporated into the rubber. This ensures a thorough and uniform ingredient dispersion in the rubber. During the mixing process, it is important to keep the temperature as low as possible. Ingredients not included in this step are those constituting the curing system. These are normally added in the last step, usually at a lower temperature.

Further information on elastomer compounding is contained in pages 496 to 507 of The Vanderbilt Rubber Handbook, Thirteenth Edition, published by R. T. Vanderbilt Company Inc., Norwalk, Conn., and in U.S. Pat. Nos. 5,331,053; 5,391,623; 5,480,941 and 5,830,395.

In some circumstances, mixing of ingredients can also be achieved by roll milling. A calender is a set of multiple large diameter rolls that squeezes rubber compound into a thin sheet.

Another approach is to use an extrusion process where the raw materials are mixed and extruded into a sheet in a single process. The extruder consists of a screw and barrel, screw drive, heaters and a die. The extruder applies heat and pressure to the compound. For tire treads, the die cross sectional profile is adapted to the desired tread design and the tread can be extruded in one piece.

There are three further stages in tire production, namely component assembly, pressing, and curing. In component assembly, a drum or cylinder is used as a tool onto which the various components are laid. During assembly, the various components are either spliced or bonded with adhesive. A typical sequence for layup of tire components is to first position a rubber sheet inner liner. Such a liner is compounded with additives that result in low air permeability. This makes it possible to seal air in the tire. The second component is a layer of calendered body ply fabric or cord coated with rubber and an adhesion promoter. The body ply or plies are turned down at the drum. Steel beads are applied and the liner ply is turned up thereby wrapping the bead. Bead rubber includes additives to maximize strength and toughness. Next, the apex components are positioned. This is followed by a pair of chafer strips and the sidewalls. These resist chafing when mounting the tire onto the rim. The remaining carcass plies are inserted as as part of the sidewall assembly. The drum is then collapsed and the first stage assembly is ready for the second component assembly stage.

Second stage assembly is done on an inflatable bladder mounted on steel rings. The green first stage assembly is fitted over the rings and the bladder inflates it up to a belt guide assembly. Steel belts to provide puncture resistance are then placed in position. The belts are calendered sheets consisting of a layer of rubber, a layer of closely spaced steel cords and a second rubber layer. The steel cords are oriented radially in a radial tire construction and at opposing angles in a bias tire construction. Passenger vehicle tires are usually made with two or three belts. An overlay is applied over the top belt. Examples of these techniques can be found in U.S. Pat. No. 6,106,752 (injection molding); U.S. Pat. No. 6,899,782 (extrusion) and U.S. Pat. No. 7,005,022 (extrusion and needling).

The final component, the tread rubber profile of subtread and tread block layers, is then applied. The tread assembly is rolled to consolidate it to the belts and the finished assembly (green cover) is then detached from the machine. Many higher-performance tires include an optional extruded cushion component between the belt package and the tread to isolate the tread from mechanical wear from the steel belts. If desired, the tire building process can be automated with each component applied separately along a number of assembly points. Following layup, the assembly is pressed to consolidate all the components into a form very close to the final tire dimension.

Curing or vulcanizing of the elastomer into the final tire shape takes place in a hot mold. The mold is engraved with the tire tread pattern. The green tire assembly is placed onto the lower mold bead seat, a rubber bladder is inserted into the green tire and the mold closed while the bladder inflates to a pressure of about 25 kgf/cm$^2$. This causes the green tire to flow into the mold, thereby taking on the tread pattern. The bladder is filled with a recirculating heat transfer medium such as steam, hot water or inert gas. Cure temperature and curing time will vary for different tire types and elastomer formulations but typical values are about 150 to 180 degrees centigrade with a curing time from about 12 to 25 minutes. For large tires, the cure time can be much longer. At the end of the cure, the pressure is bled down, the mold opened and the tire stripped from the mold. The tire may be placed on a post-cure inflator that will hold the tire fully inflated while it cools.

What is claimed is:

1. A tire comprising a bead, a first, second and third carcass ply, each ply comprising continuous filaments having a tenacity of at least 15 grams force per dtex and a modulus of at least 400 grams force per dtex wherein turn-ups of the first and second carcass plies terminate within a tire apex region and wherein
   (i) a first apex component is positioned between the bead, the second carcass ply and the second carcass ply turn-up,
   (ii) a second apex component is positioned between the second carcass ply turn-up, the second carcass ply and the first carcass ply turn-up,
   (iii) a third apex component is positioned between the first carcass ply turn-up, the second carcass ply and the third carcass ply, and
   (iv) the first, second and third apex components comprise an elastomeric compound having a modulus in the range of from 3 to 50 MPa.

2. The tire of claim 1, wherein the continuous filaments are metallic or polymeric.

3. The tire of claim 2, wherein the polymer of the continuous filament is aromatic polyamide, aromatic co-polyamide, aliphatic polyamide or polyester.

4. The tire of claim 3, wherein the aromatic polyamide is p-aramid.

* * * * *